(12) United States Patent
Ludwig et al.

(10) Patent No.: US 6,989,189 B2
(45) Date of Patent: Jan. 24, 2006

(54) SEPARABLE LAYER OF BONDING MATERIAL, LAMINATE AND METHOD FOR MAKING SAME

(75) Inventors: Peter Ludwig, Raubling (DE); Wilhelm Munninger, Neubeuern (DE); Werner Tschenet, Raubling (DE)

(73) Assignee: Mondi Inncoat GmbH, (DE)

( * ) Notice: Subject to any disclaimer, the term of this patent is extended or adjusted under 35 U.S.C. 154(b) by 0 days.

(21) Appl. No.: 10/422,043

(22) Filed: Apr. 23, 2003

(65) Prior Publication Data

US 2003/0186070 A1 Oct. 2, 2003

Related U.S. Application Data

(63) Continuation-in-part of application No. 09/892,395, filed on Jun. 27, 2001, now abandoned.

(30) Foreign Application Priority Data

Jun. 30, 2000 (DE) ................. 100 31 909

(51) Int. Cl.
*B32B 7/06* (2006.01)

(52) U.S. Cl. ................. 428/216; 156/244.11; 156/324; 428/214; 428/215; 428/512; 428/513

(58) Field of Classification Search ............... 428/214, 428/215, 216, 512, 513; 156/244.11, 324
See application file for complete search history.

(56) References Cited

U.S. PATENT DOCUMENTS 4,237,334 A * 12/1980 Kojima et al. ............ 174/25 R

* cited by examiner

Primary Examiner—D. S. Nakarani

(57) ABSTRACT

A separable layer of permanently thermoplastic bonding material made by extrusion lamination comprises a mixture of
i) silicone-modified low density polyethylene (LDPE); and
ii) polyolefin which is adherent in state of plastic flow.

In the laminate, a backing layer and a top layer are laminated together therewith. The laminate is produced either by flat sheet monoextrusion or flat sheet coextrusion of the bonding material.

28 Claims, 1 Drawing Sheet

SEPARABLE LAYER OF BONDING MATERIAL, LAMINATE AND METHOD FOR MAKING SAME

This application is a continuation-in-part of application Ser. No.: 09/892,395 filed Jun. 27, 2001, now abandoned.

BACKGROUND OF THE INVENTION

The invention relates to a separable layer of permanently thermoplastic bonding material, to a laminate to a method for making same.

Separable layers of bonding material are used to secure cards such as check cards, credit cards, club membership cards or chip cards to a backing made of paper, cardboard or plastic. A further area of application for a separable layer of bonding material is lamination of a cling vinyl film onto a backing. The term "cling vinyl film" stands for an adhesive-free film which has been internally plasticized and thereby is self-adhesive, and which in printed form is attached to truck surfaces, for example, for advertising purposes.

To simplify the terminology, the object which is to be secured by a separable layer of bonding material to a backing will be referred to hereinafter as the information carrier. The following requirements are imposed on the separable layer of bonding material.

The bonding material must create, between information carrier and backing, a permanent composite bond which safely withstands further processing and distribution, is insensitive to climatic fluctuations and is aging-resistant.

It must be possible to detach the information carrier from the backing in a manner that is simple, convenient and guaranteed not to cause damage. Residues of bonding material must not remain on the information carrier.

The backing surface must no longer be tacky after detachment of the information carrier. The backing is often inserted into a file, and must not stick to it.

Pertinent separable adhesives are known in the literature as peelable glues. They are pressure-sensitive adhesives with low surface tackiness, especially polyacrylate solutions or dispersions, which may be partly cross-linked, and hot-melt adhesives, which bond firmly to the backing, which is usually made of paper, and can be peeled off from the back side of the information carrier, which is relatively resistant to splitting. The known adhesives do not always meet the cited requirements profile to a completely satisfactory degree.

SUMMARY OF THE INVENTION

The object of the invention is to provide a separable layer of permanently thermoplastic bonding material that is improved in the foregoing respect.

The achievement of this object, in a first embodiment, is seen in a separable layer of permanently thermoplastic bonding material which is made by extrusion lamination and which comprises a mixture of i) silicone-modified low density polyethylene (LDPE), which is a LDPE graft copolymer with LDPE main chains and silicone side chains chemically bonded thereto, and which is a prereacted, linear crosslinked thermoplastic material; and ii) polyolefin which is adherent in state of plastic flow.

The achievement of this object, in a second embodiment, is seen in a separable layer of permanently thermoplastic bonding material made by extrusion lamination comprising a mixture of i) low density polyethylene (LDPE), mixed with non-reactive silicone oil; and ii) polyolefin which is adherent in state of plastic flow.

The general customary term "silicone" used here stands chemically for polydimethylsiloxane (PDMS).

Conventional thermoplastic bonding materials for extrusion lamination are tacky when they arrive as a melt film on the substrate. They normally create a permanent adhesive bond and, after cooling, do not have any surface tackiness.

The special feature of the invention is the production of a separable layer of bonding material by extrusion lamination, wherein extrusion polymers with mutually conflicting properties—anti-adhesive (releasable) silicone-modified low density polyethylene on the one hand and adherent polyolefin on the other hand—are used in well-defined mixtures. Therewith the silicone-modified polyethylene originally designed as separating medium is used for the first time for lamination, and for this purpose is mixed in a specific ratio with polyolefin which is adherent in the state of plastic flow.

In a preferred embodiment, the polyethylene is grafted with the silicone. A possible material is the silicone-grafted LD polyethylene LUBOTENE RLF-4003 of Optatech Corporation.

The polyethylene may also be mixed with silicone oil.

The separable layer of bonding material either can be monoextruded or can also be coextruded with polyolefin, preferably LD polyethylene.

The subject matter of the invention is also a laminate with a bakking layer and a top layer, which are laminated together with a layer of bonding material of the said type extruded therebetween.

A monoextruded layer of bonding material is homogeneous. Its adhesion to the backing layer and top layer depends on the choice of material therefor.

For practical purposes the backing layer can be regarded as the upper layer of the backing on which the information carrier is to be fixed detachably, and the top layer can be regarded as the lower layer of the information carrier. The backing layer is preferably made of paper and the top layer is preferably made of special paper which is resistant to surface splitting or plastic-coated paper or plastic film. the bonding material has considerably stronger bonding to the backing layer than to the top layer.

The monoextruded layer of bonding material preferably has a thickness of 10 to 40μ.

Coextrusion of the layer of bonding material is recommended for critical backing layers such as calendered craft paper, plastic-coated papers or plastic films. The coextruded material comprises a thick base layer of polyolefin, expecially LD polyethylene, which faces the backing layer, and a thin layer of bonding material, which faces the top layer. This layer structure of the coextruded material ensures that bonding to backing layer and top layer can be differentially adjusted and precisely controlled. The composite bond is durably stable.

Manufacturing-related advantages for coextrusion exist in the possibility of different temperature programs for the two melts. The temperature of the LD polyethylene melt is preferably about 280° C. and the temperature of the melt of bonding material is preferably not higher than about 220° C.

Material costs can be saved with coextrusion. LD polyethylene is considerably more cost-effective than the inventive bonding material comprising silicone-modified polyethylene and adherent polyolefin.

Compared with the conventional lamination procedures with adhesive solutions or dispersions, extrusion lamination (monoextrusion or coextrusion) with the inventive bonding material is more cost-effective.

Distribution and processing of LD PE granules and silicone-modified LD PE granules are considerably less expensive and considerably simpler.

Operation with broader material webs and higher machine speeds is possible during extrusion lamination.

Extrusion lamination is environmentally friendly. It does not require solvents and dispersions, and so the environmental problems associated with drying and evaporation of organic solvents and with disposal of adhesive residues and washing fluids do not occur.

The polyolefin base layer in the coextruded material preferably has a thickness of 10 to 30μ. The thickness of the layer of bonding material is preferably 1 to 10μ.

In the bonding material, the silicone proportion of the polyethylene ranges between 0.1 and 3 wt %. If the top layer comprises nonpolar plastic film, especially polyolefin, the silicone proportion tends toward 0.1 wt % because of the low chemical affinity of the film surface. If the top layer comprises polar plastic film, expecially polyvinyl chloride (PVC), polyethylene terephthalate (PET), polycarbonate (PC), polystyrene (PS), the silicone proportion tends toward 3 wt % because of the higher chemical affinity of the film surface and the strong chemical bonding forces. The mixing ratio must be adapted to the material and to the surface texture (smooth/rough/glossy/dull) of the top layer and to the strength of the desired adhesion, taking into consideration the respective extrusion conditions.

A method for making the inventive laminate comprises drawing off webs of backing material and top material from one coil each, uniting them on a cooling cylinder with pressure roll, extruding the bonding material therebetween and, after the laminate has traveled around part of the circumference of the cooling cylinder, guiding it away therefrom and winding it on a coil.

Either the thermoplastic bonding material can be monoextruded through a coating die (flat sheet die), or the thermoplastic bonding material together with polyolefin, preferably LD polyethylene, can be coextruded through a coating die (flat sheet die).

BRIEF DESCRIPTION OF THE DRAWINGS

The invention will be explained in more detail hereinafter with reference to practical examples illustrated in the drawing, wherein.

DETAILED DESCRIPTION OF THE PREFERRED EMBODIMENTS

Figure 1:
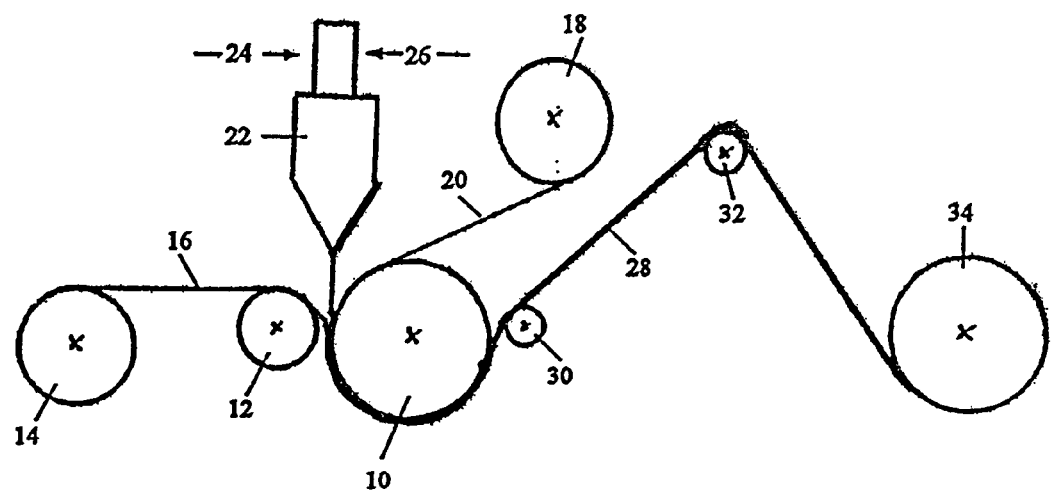
FIG. 1 shows the diagram of a system for making a laminate.

FIG. 1 shows a laminator with a cooling cylinder 10 and a pressure roll 12. A web of backing material 16 is drawn off from a first coil 14. A web of top material 20 is drawn off from a second coil 18. Webs 16, 20 are united at the gap between cooling cylinder 10 and pressure roll 12 and are laminated together by broad-slot coextrusion (flat sheet coextrusion with a coating die).

LD polyethylene 24 is fed to coextruder 22 on the side facing bakking layer 16, and a mixture 26 of LD polyethylene and silicone-modified LD polyethylene is fed on the side facing top layer 20. After laminate 28 has traveled over approximately half of the circumference of cooling cylinder 10, it is guided away therefrom over rolls 30, 32 and wound onto a coil 34.

Figure 2:
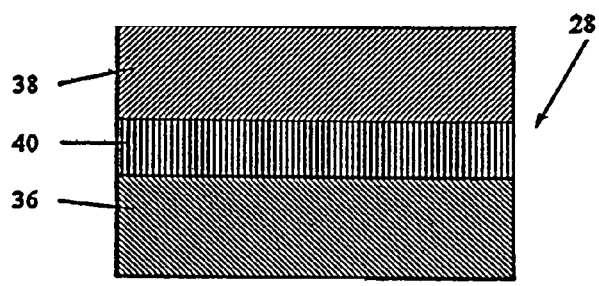
FIG. 2 schematically shows, not to scale, the structure of a laminate with a monoextruded layer of bonding material.

FIG. 2 shows a laminate 28 with a backing layer 36, a top layer 38 and, monoextruded therebetween, a layer 40 of bonding material which comprises a mixture 26 of LD polyethylene and silicone-modified LD polyethylene.

Figure 3:
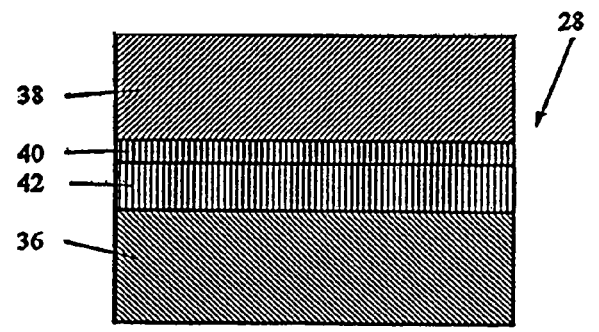
FIG. 3 schematically shows, not to scale, the structure of a laminate with a coextruded layer of bonding material.

FIG. 3 shows a laminate 28 with a backing layer 36, a top layer 38 and, coextruded therebetween, a two-layer structure which is formed from a relatively thick base layer 42 of LD polyethylene facing bakking layer 36 and from a relatively thin layer 40 of bonding material which faces top layer 38 and which comprises a mixture 26 of LD polyethylene and silicone-modified LD polyethylene.

EXAMPLE

Backing layer 36 is made of paper. Top layer 38 is made of OPP film (oriented polypropylene film) of 60μ thickness. The silicone proportion of modified LD polyethylene 26 is 0.15 to 0.6 wt %. Layer 40 of bonding material cannot be detached from backing layer 36 without damage. Its adhesion to top layer 38 is 2 to 16 N/m in the peeling test at a pull-off angle of 180° and a travel speed of 300 mm/min.

What is claimed is:

1. A laminate with a backing layer and a top layer, which are laminated together with a separable layer of permanently thermoplastic bonding material extruded therebetween by extrusion lamination comprising a mixture of
   i) silicone-modified low density polyethylene (LDPE), which is a LDPE graft copolymer with LDPE main chains and silicone side chains chemically bonded thereto, and which is a prereacted, linear crosslinked thermoplastic material; and
   ii) polyolefin which is adherent in state of plastic flow;
   wherein the backing layer is made of a member selected from the group consisting of paper, plastic film and a combination thereof, and wherein the paper is calendered craft paper with a density of more than 1 g/cm$^3$ and a smoothness between 40 and 120 Sheffield Units.

2. A laminate according to claim 1, wherein the paper is plastic-coated paper.

3. A laminate according to claim 1, wherein the top layer is made of a member selected from the group consisting of special paper which is resistant to surface splitting, plastic-coated paper, plastic film and a combination thereof.

4. A laminate according to claim 1, wherein the silicone proportion of the polyethylene ranges between 0.1 and 3 wt %.

5. A laminate according to claim 1, wherein the bonding material is monoextruded.

6. A laminate according to claim 5, wherein the bonding material is 10 to 40μ thick.

7. A laminate according to claim 1, wherein the bonding material is coextruded with polyolefin in a two-layer structure.

8. A laminate according to claim 7, wherein said polyolefin is low density polyethylene.

9. A laminate according to claim 7, wherein, in the coextruded two-layer structure, the polyolefin is 10 to 30µ thick and the bonding material is 1 to 10µ thick.

10. A laminate according to claim 1, wherein the bonding material faces the top layer.

11. A laminate with a backing layer and a top layer which are laminated together with a separable layer of permanently thermoplastic bonding material extruded therebetween by extrusion lamination comprising a mixture of
   i) silicone-modified low density polyethylene (LDPE), which is a LDPE graft copolymer with LDPE main chains and silicone side chains chemically bonded thereto, and which is a prereacted, linear crosslinked thermoplastic material; and
   ii) polyolefin which is adherent in state of plastic flow; and
      wherein the backing layer is made of a member selected from the group consisting of plastic-coated paper, plastic film and a combination thereof.

12. A laminate according to claim 11, wherein the paper is calendered craft paper with a density of more than 1 g/cm$^3$ and a smoothness between 40 and 120 Sheffield Units.

13. A laminate according to claim 11, wherein the top layer is made of a member selected from the group consisting of special paper which is resistant to surface splitting, plastic-coated paper, plastic film and a combination thereof.

14. A laminate according to claim 11, wherein the silicone proportion of the polyethylene ranges between 0.1 and 3 wt %.

15. A laminate according to claim 11, wherein the bonding material is monoextruded.

16. A laminate according to claim 15, wherein the bonding material is 10 to 40µ thick.

17. A laminate according to claim 11, wherein the bonding material is coextruded with polyolefin in a two-layer structure.

18. A laminate according to claim 17, wherein said polyolefin is low density polyethylene.

19. A laminate according to claim 17, wherein, in the coextruded two-layer structure, the polyolefin is 10 to 30µ thick and the bonding material is 1 to 10µ thick.

20. A laminate according to claim 11, wherein the bonding material faces the top layer.

21. A method for making a laminate wherein a laminate with a backing layer and a top layer, are laminated together with a separable layer of permanently thermoplastic bonding material extruded therebetween by extrusion lamination comprising a mixture of
   i) silicone-modified low density polyethylene (LDPE), which is a LDPE graft copolymer with LDPE main chains and silicone side chains chemically bonded thereto, and which is a prereacted, linear crosslinked thermoplastic material; and
   ii) polyolefin which is adherent in state of plastic flow;
      wherein the backing layer is made of a member selected from the group consisting of paper, plastic film and a combination thereof, and wherein the paper is calendered craft paper with a density of more than 1 g/cm$^3$ and a smoothness between 40 and 120 Sheffield Units; and
      wherein webs of backing material and top material are drawn off from one coil each and united on a cooling cylinder with pressure roll the bonding material is extruded therebetween and, after the laminate has traveled around part of the circumference of the cooling cylinder, it is guided away therefrom and wound on a coil.

22. A method according to claim 21, wherein the bonding material is monoextruded through a coating die.

23. A method according to claim 21, wherein the bonding material together with polyolefin, is coextruded through a coating die.

24. A method according to claim 23, wherein said polyolefin in is low density polyethylene.

25. A method for making a laminate wherein a laminate with a backing layer and a top layer are laminated together with a separable layer of permanently thermoplastic bonding material extruded therebetween by extrusion lamination comprising a mixture of
   i) silicone-modified low density polyethylene (LDPE), which is a LDPE graft copolymer with LDPE main chains and silicone side chains chemically bonded thereto, and which is a prereacted, linear crosslinked thermoplastic material; and
   ii) polyolefin which is adherent in state of plastic flow;
      wherein the backing layer is made of a member selected from the group consisting of plastic-coated paper, plastic film and a combination thereof; and
wherein webs of backing material and top material are drawn off from one coil each and united on a cooling cylinder with pressure roll the bonding material is extruded therebetween and, after the laminate has traveled around part of the circumference of the cooling cylinder, it is guided away therefrom and wound on a coil.

26. A method according to claim 25, wherein the bonding material is monoextruded through a coating die.

27. A method according to claim 25, wherein the bonding material together with polyolefin, is coextruded through a coating die.

28. A method according to claim 27, wherein said polyolefin is low density polyethylene.

* * * * *